(No Model.) 3 Sheets—Sheet 1.

W. W. LEWIS.
BALANCED VALVE.

No. 303,868. Patented Aug. 19, 1884.

Attest.
C. Shappell.
Thos Mantz

Inventor.
William W. Lewis,
By Lewis Hosea, atty.

(No Model.) 3 Sheets—Sheet 2.

W. W. LEWIS.
BALANCED VALVE.

No. 303,868. Patented Aug. 19, 1884.

Attest.
C Shappell
Thos Mantz

Inventor.
William W. Lewis,
By Lun Hosea, atty.

(No Model.) 3 Sheets—Sheet 3.

W. W. LEWIS.
BALANCED VALVE.

No. 303,868. Patented Aug. 19, 1884.

Attest. Inventor.
C. Shappell. William W. Lewis,
Wm. Mantz By L. M. Hosea, atty.

N. PETERS. Photo-Lithographer, Washington, D. C.

UNITED STATES PATENT OFFICE.

WILLIAM W. LEWIS, OF CINCINNATI, OHIO.

BALANCED VALVE.

SPECIFICATION forming part of Letters Patent No. 303,868, dated August 19, 1884.

Application filed April 11, 1884. (No model.)

*To all whom it may concern:*

Be it known that I, WILLIAM H. LEWIS, a citizen of the United States, residing at Cincinnati, Ohio, have invented new and useful Improvements in Balanced Valves for Steam-Engines, of which the following is a specification.

My invention relates to slide-valves of steam-engines, its object being to relieve the excessive pressure of steam upon such valves during their operation in use, thereby economizing the power required to move the same and preventing the wear of the sliding surfaces. This I accomplish by shutting off the access of steam from the larger part of the upper surface of the valve, thus diminishing the pressure proportionably to the area relieved. The means employed for this purpose consist, essentially, of one or more rings or plates constituting or inclosing part of the upper surface of the valve, and upheld against the valve-chest cover or against a fixed plate within the valve-chest, against which the rings or plates slide as the valve moves and prevent access of steam to the inclosed area of the valve-surface. Rings designed to shut off steam from the inclosed area of the valve-surface have been heretofore employed and upheld by the action of springs, or by steam admitted from the interior of the valve-chest; but such devices have proved inefficient from the known imperfection of springs used under such circumstances and from the intermittent action of steam when supplied from the valve-chest. My improvements in this regard consist in admitting steam direct from the boiler to and beneath a supporting-plate arranged in the valve as a piston, whereby the same is rendered operative at all times independently of the steam admitted in the valve-chest; and, further, in a construction of the said piston-plate with packing actuated by steam from the same independent source, whereby the entire action is maintained perfect and continuous. The constructive details will more fully appear from the following description:

Mechanism embodying my invention is exhibited in the accompanying drawings, in which—

Figure 1:
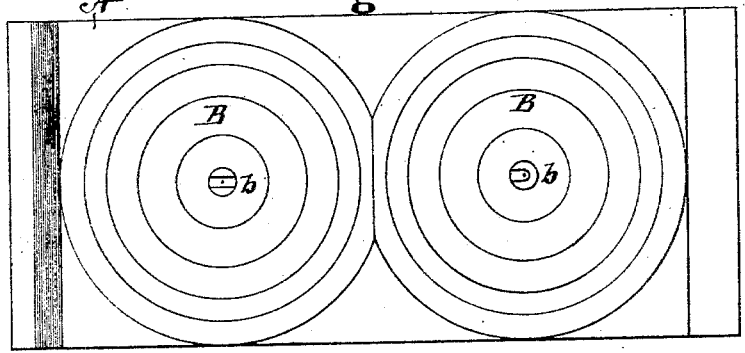
Figure 2:
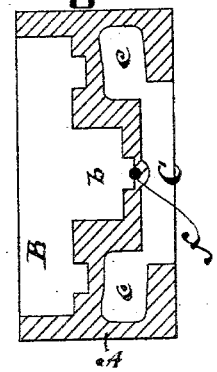
Figure 3:
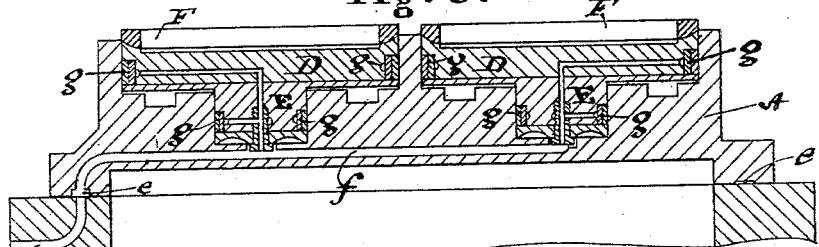
Figure 4:
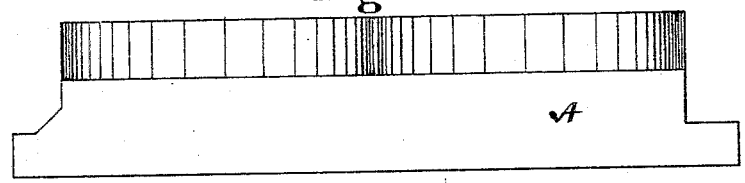
Figure 5:
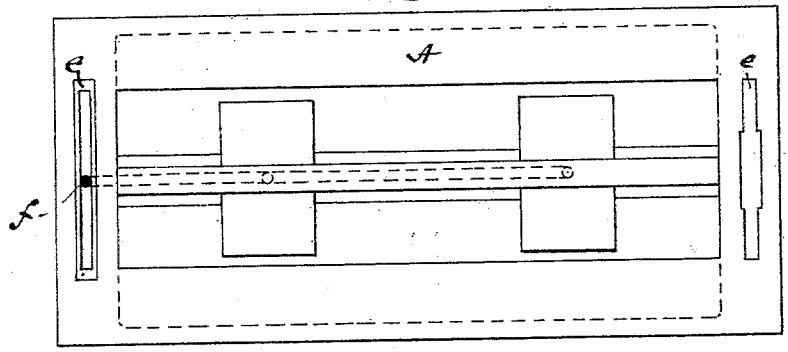
Figure 6:
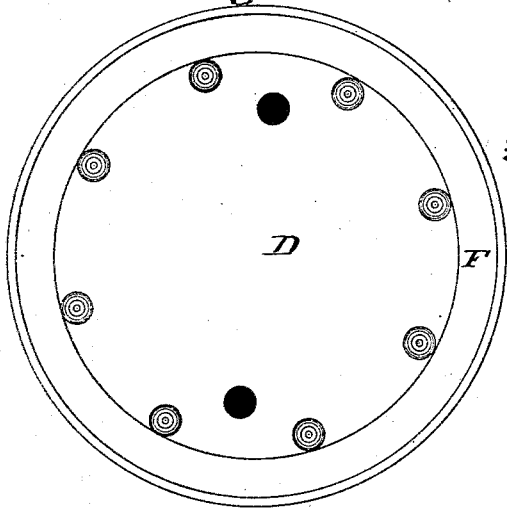
Figure 7:
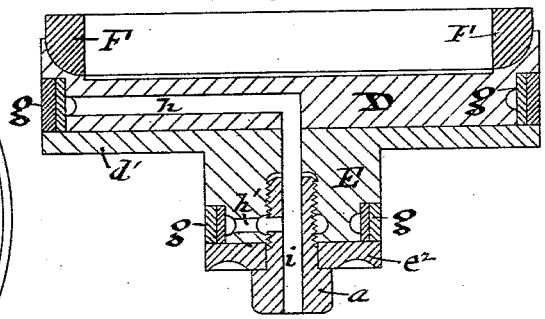
Figure 8:
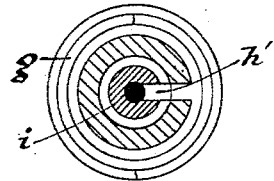
Figure 9:
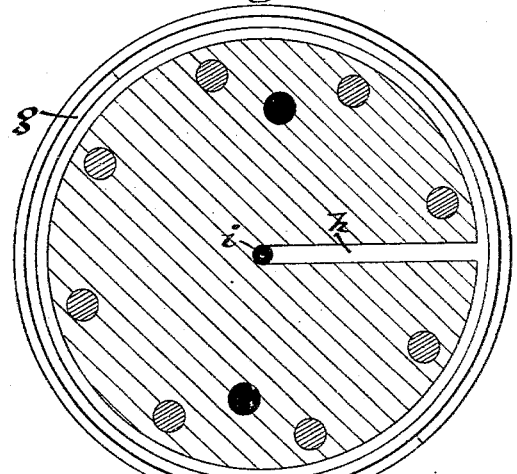
Figure 10:
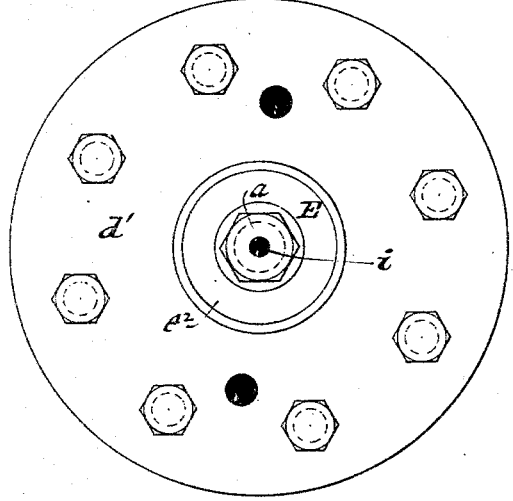
Figure 11:
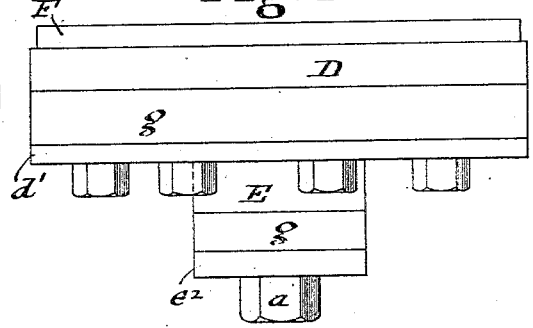
Figure 12:
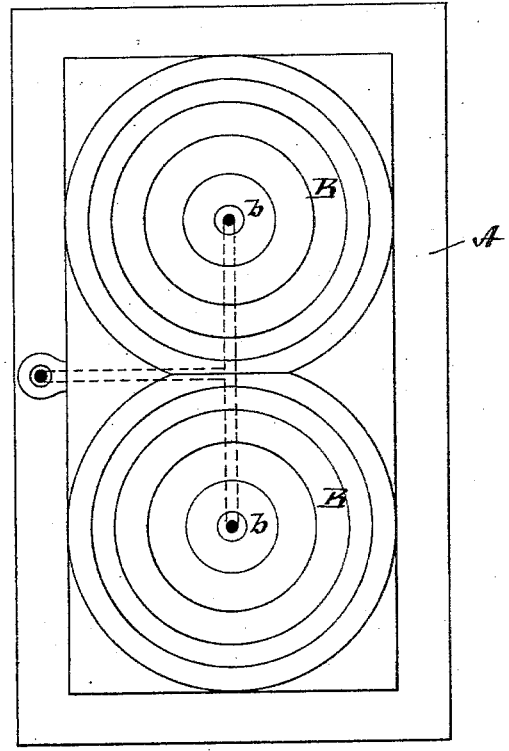
Figure 13:
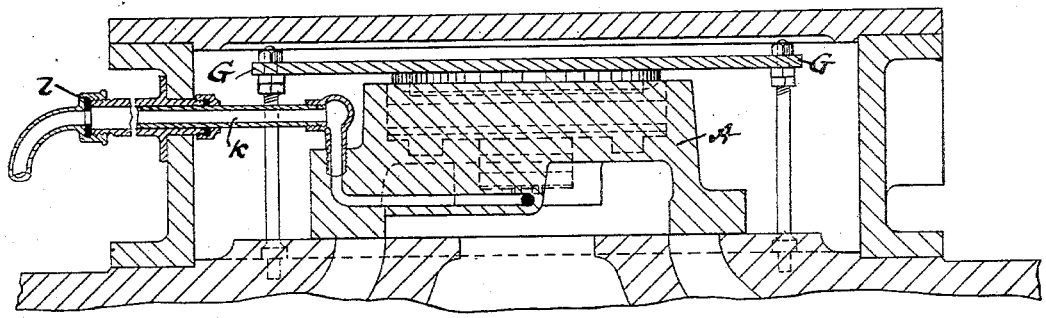

Figure 1 is a plan view of a locomotive slide-valve to which my invention is applied; Fig. 2, a vertical cross-section taken in the line of the valve movement centrally through one of the piston-plate apertures. Fig. 3 is a vertical cross-section of the valve complete, taken in a line perpendicular to the valve movement. Fig. 4 is a side elevation of the valve. Fig. 5 is an end or plan view of the valve. Fig. 6 is a top plan view of one of the piston-plates. Fig. 7 is an axial section of one of the piston-plates complete, with supported ring. Fig. 8 is a horizontal section of the piston proper of one of the "piston-plates," taken through the line of the steam-aperture leading to the packing. Fig. 9 is a horizontal section taken through the ring-supporting plate in the line of the steam-aperture communicating with the packing. Fig. 10 is an under plan view of the ring-supporting plate and its piston proper. Fig. 11 is a general side elevation of the ring-supporting plate and its piston, and Figs. 12 and 13 are a plan view and vertical longitudinal section, respectively, of a slightly-modified construction, showing another mode of admitting steam to actuate the ring-supporting plate, and an independent fixed plate introduced in the steam-chest above the valve for the sliding bearing of the rings.

A in the drawings designates the valve, which in the present case is of greater width than length, as is common in locomotive construction. In the top of the valve A are two cylindrical recesses, B, placed side by side, as shown, and occupying as much of the surface area of the valve as conveniently possible. In a valve more nearly square but one such recess may be required; but in the present case two are obviously more convenient. At the bottom of each recess a further cylindrical recess, $b$, is formed, and as the disposition of the metal may thus encroach upon the area of the exhaust-cavity $c$ in the under side of the valve, the latter may be enlarged by coring, as at $c\ c$. The recesses B $b$ are bored true for the purpose of receiving a cylindrical plate, D, provided with peripheral packing, fitting accurately and steam-tight the circular bore of the recess B, and terminating below in a small concentric piston, E, also provided with peripheral packing fitting accurately and steam-tight the bore of the recess b. The upper surface of the plate D is slightly depressed, with an outer concave margin, to form a seat for a flat ring, F, whose under surface is correspondingly convexed. The ring F by this construction has a slight "ball-and-socket" movement, enabling it, while preserving a steam-tight joint in its seat, to accommodate itself to any defect in the surface alignment of the valve-chest cover or other surface against which it moves.

It will be readily understood that, if steam be admitted below the smaller pistons E in the recesses b, said pistons will carry the plates D and rings F upward, and the latter will be held against the steam-chest cover or an interposed plate, G, (shown in Fig. 13,) against whose under surface the rings are designed to form a steam-tight sliding contact.

It will be obvious without further explanation that if the parts are properly constructed and proportioned such pressure will be just sufficient to maintain said rings in the desired contact, and to thus shut off steam from the inclosed surface area of the valve without adding appreciably to the downward pressure of the valve. The steam for maintaining said plates and rings in the desired position is admitted by suitable boiler-connections through a channel, d, in the valve-seat, opening at the side of the line of valve-ports, preferably at the center line of the exhaust-port, upward through the valve-seat beneath the valve A. In the under side of the valve, in a corresponding line, is a shallow groove, e, of a length corresponding with the valve travel, and communicating centrally with a channel, f, carried upward and across through the valve A and communicating with the recesses b b. Said channel may also be extended into an open groove, similar to e, at the opposite under surface of the valve, for the purpose of balancing the steam-pressure acting upward against the valve and tending to lift it from its seat; or an open groove, e, may be made at such opposite side, communicating with the interior of the steam-chest, but without connecting with the channel f. The peripheral packing of the plates D and pistons E is arranged and operated as follows: The peripheral surfaces are grooved in the ordinary manner, and provided with double flat rings, one within the other, with single splits arranged at opposite positions, these rings being accurately fitted to the grooves and constituting the packing of the contact-surfaces. At the bottom of each peripheral groove or seat is a smaller groove, into which open radial channels h h, communicating with a central axial channel, i, extending downward through the piston and communicating with the recess b, thus receiving steam direct from the channel f.

For convenience of construction, in forming the packing-ring grooves and placing the rings in position, I construct the plates D in two parts, divided horizontally, the lower part or plate, d, constituting the lower wall of the packing-ring groove. The piston E is similarly constructed, with follower e constituting the lower wall of its packing-groove. These parts are held together by bolts and nuts in the usual manner. As constructed in the present case, the bolt a, securing the follower e to the piston E, is perforated to constitute part of the steam-channel i.

It remains but to speak of the modifications shown in Figs. 12 and 13. In cases where it may not be desirable or practicable to admit steam to actuate the balancing-plates through the valve-seat, it may be admitted through a pipe, K, attached to the valve, having a telescopic connection with a pipe, l, communicating with the boiler. The construction will be readily understood from the sectional view, Fig. 13. The plate G, also shown in said figure, may be employed as the bearing-surface of the balancing-plates, and may be secured upon suitable standards or studs upon which it is adjusted by jam-nuts.

I claim as my invention, and desire to secure by Letters Patent—

1. A slide-valve for steam-engines, provided with balancing plates or rings (one or more) adapted to form a sliding joint with the steam-chest cover, or a superimposed plate to shut off access of steam to valve-surface area inclosed, said plates or rings being upheld by the direct action of steam admitted independently from the boiler, substantially as set forth.

2. A slide-valve for steam-engines, provided with a recess (one or more) adapted to receive a suitably-packed piston-plate, D, and with a counter recess, b, adapted to receive a piston, E, to uphold the plate D, and with means, substantially such as described, for the admission of steam independently of the steam-chest to the piston, as set forth.

3. In a steam-engine slide-valve, a combined piston and plate, D E, provided with packing-rings g g, and means, substantially as described, for the admission of steam within and behind the packing-rings, as set forth.

4. A steam-engine slide-valve provided with a piston or pistons for upholding plates or rings for shutting off steam from the valve-surface, constructed with a steam-channel, f, for receiving and conducting steam to said pistons independently of the steam-chest, as set forth.

5. In a steam-engine slide-valve provided with recesses for the reception and operation of balancing-pistons, a steam-conduit communicating with the piston-recesses, and terminating in a longitudinal slot in the face of the valve in the line of its travel, and adapted to receive steam from an opening in the valve-seat, substantially as set forth.

6. In combination with a recessed slide-valve, a double piston, D E, provided with steam-conduits *i h h*, substantially as and for the purpose set forth.

7. In a balanced slide-valve for steam-engines, the double piston D E, constructed of parts D *d*, E *e*, arranged as shown, for the purpose specified.

In testimony whereof I have hereunto set my hand in the presence of two subscribing witnesses.

WILLIAM W. LEWIS.

Witnesses:
L. M. HOSEA,
C. SHAPPELL.